United States Patent [19]

Roth

[11] Patent Number: 4,916,694
[45] Date of Patent: Apr. 10, 1990

[54] PACKET NETWORK TIMING ANALYZER

[75] Inventor: Jacques A. Roth, San Francisco, Calif.

[73] Assignee: AMP Incorporated, Harrisburg, Pa.

[21] Appl. No.: 289,090

[22] Filed: Dec. 22, 1988

[51] Int. Cl.⁴ .............................................. H04J 3/26
[52] U.S. Cl. ......................................... 370/94; 370/4
[58] Field of Search ................. 370/85, 94, 60, 13, 370/86, 89; 375/10, 112; 379/10, 34, 88, 89; 340/720; 382/1

[56] References Cited

U.S. PATENT DOCUMENTS

| | | | |
|---|---|---|---|
| 4,493,021 | 1/1985 | Agrawal et al. | 364/200 |
| 4,547,880 | 10/1985 | De Vita et al. | 370/91 |
| 4,553,234 | 11/1985 | Brandsma et al. | 370/86 |
| 4,559,416 | 12/1985 | Theis et al. | 379/34 |
| 4,571,675 | 2/1986 | Stambaugh et al. | 364/200 |
| 4,593,281 | 6/1986 | Lare | 370/85 |
| 4,641,308 | 2/1987 | Sacarisen et al. | 371/16 |
| 4,644,533 | 2/1987 | Braff et al. | 370/94 |
| 4,646,232 | 2/1987 | Chang et al. | 364/200 |
| 4,647,912 | 3/1987 | Bates et al. | 340/825.5 |
| 4,707,829 | 11/1987 | Pendse | 370/94 |
| 4,712,209 | 12/1987 | Kuritani et al. | 370/13 |
| 4,736,368 | 5/1988 | Szczepanek | 370/89 |
| 4,771,286 | 9/1988 | Niessen et al. | 340/825.52 |
| 4,779,267 | 10/1988 | Limb | 370/85 |
| 4,792,753 | 12/1988 | Iwai | 327/73 |
| 4,800,559 | 1/1989 | Florea et al. | 370/94 |
| 4,809,265 | 2/1989 | Hart et al. | 370/85 |
| 4,815,120 | 3/1989 | Kosich | 379/34 |

FOREIGN PATENT DOCUMENTS 2577368 12/1985 France.

OTHER PUBLICATIONS

Article "Megabit Mania" LAN Magazine, Mar., 1988, p. 85.
EPO Standard Search Report DTD 5 Sept. 89.
Annex to STD Search Report.
Nachrichten Elektronik+Telematik, vol. 40, No. 10, Oct. 1986, pp. 409-413, entitled "Aufbau und Messungenam Ethernet".
Computer Communications, vol. 11, No. 2, DTD Apr. 1988, entitled "Design and Implementation of a Lan Monitoring tool".

Primary Examiner—Douglas W. Olms
Assistant Examiner—Alpus H. Hsu
Attorney, Agent, or Firm—David L. Smith

[57] ABSTRACT

A local area network timing analyzer responds to a signal on a local area network to generate a carrier detect signal which is indicative of the presence or absence of signaling activity on the local area network. The carrier detect signal alternates between two logic states indicative of packets and gaps between packets. The timing analyzer stores an array of timing entries, and individual ones of these timing entries are indicative of the time duration of individual gaps and packets. These timing entries are sorted and otherwise used to display timing information for the local area network.

22 Claims, 7 Drawing Sheets

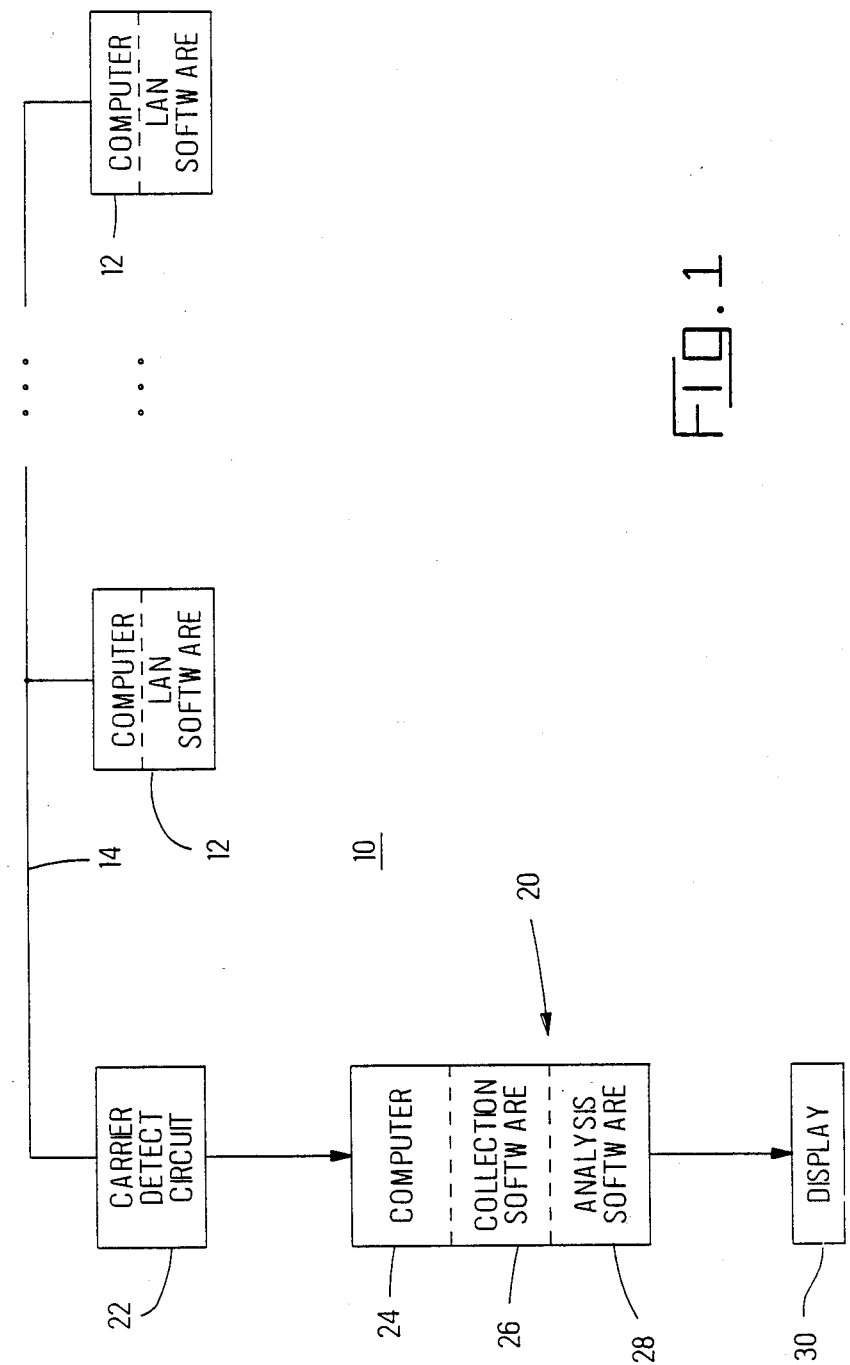

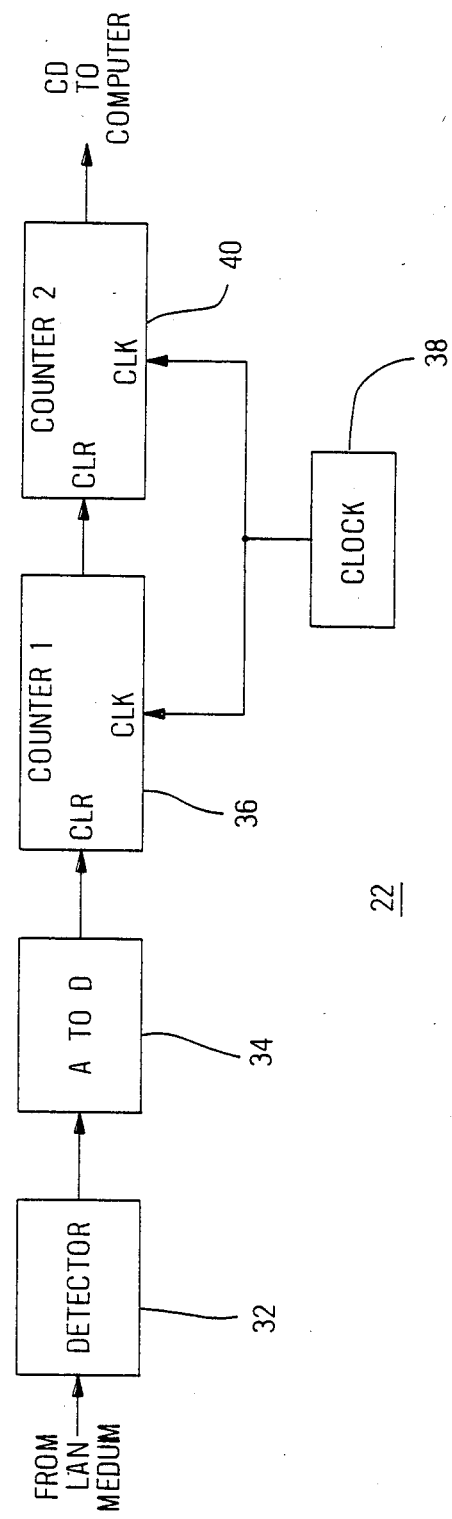

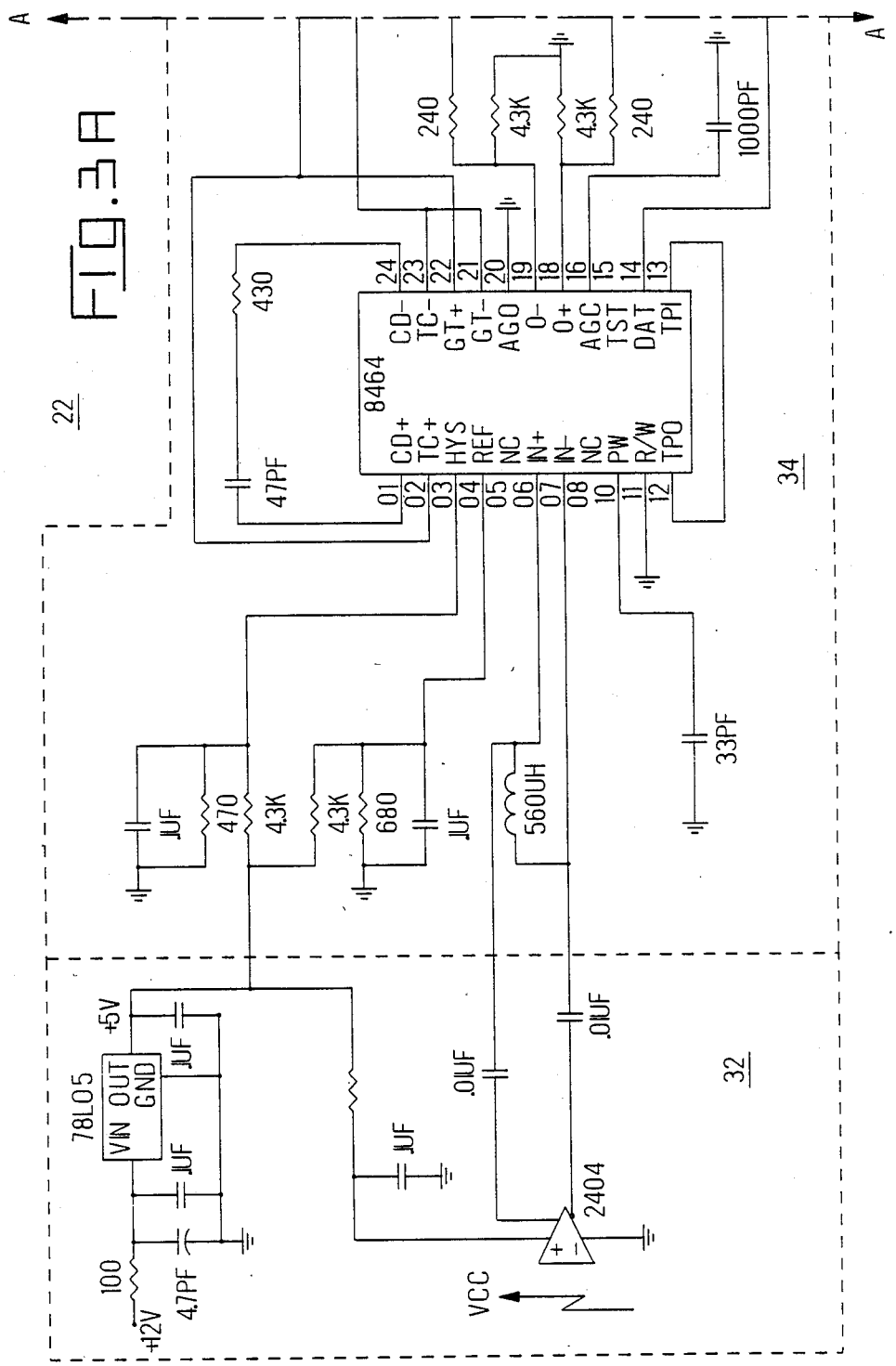

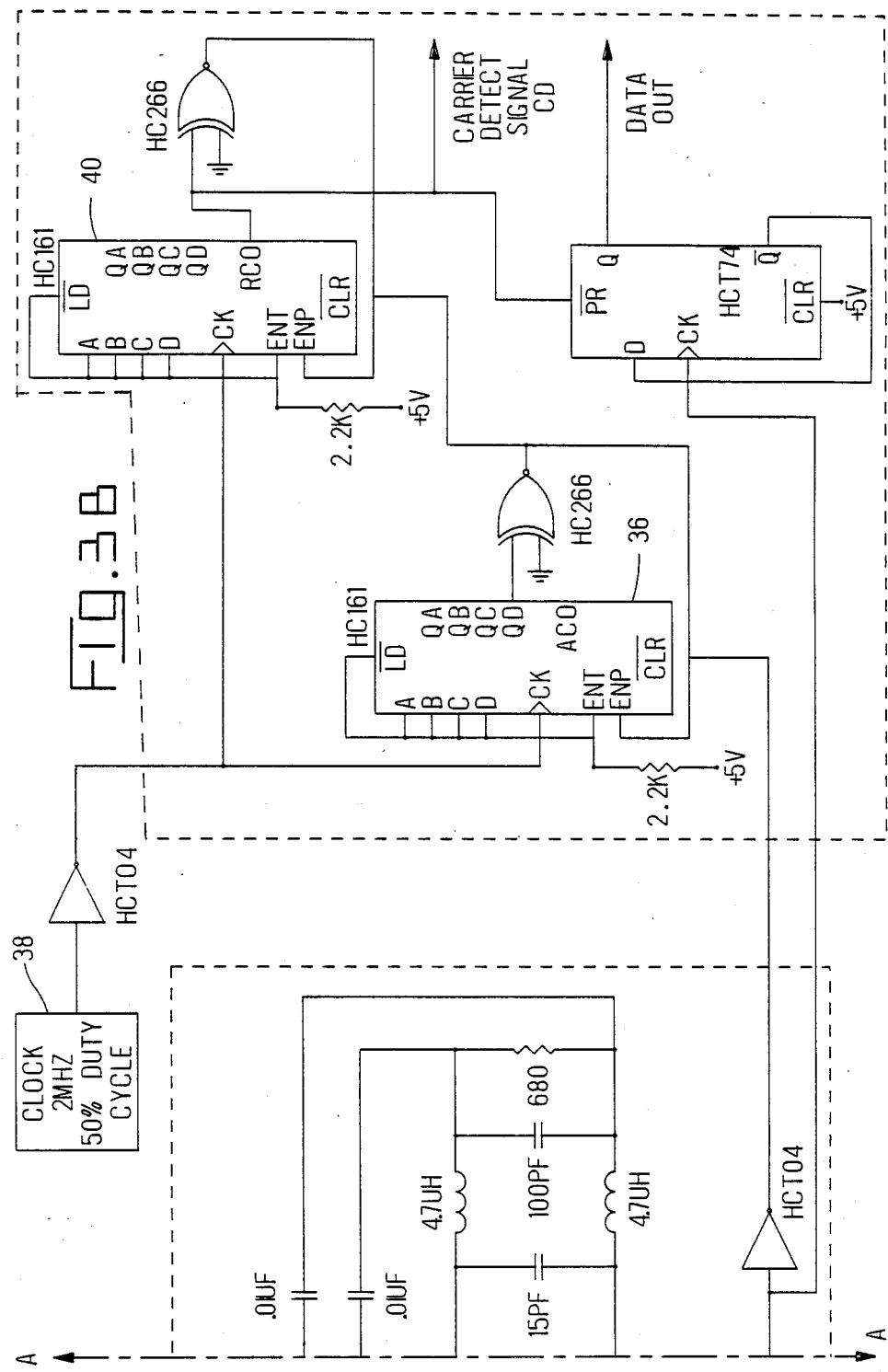

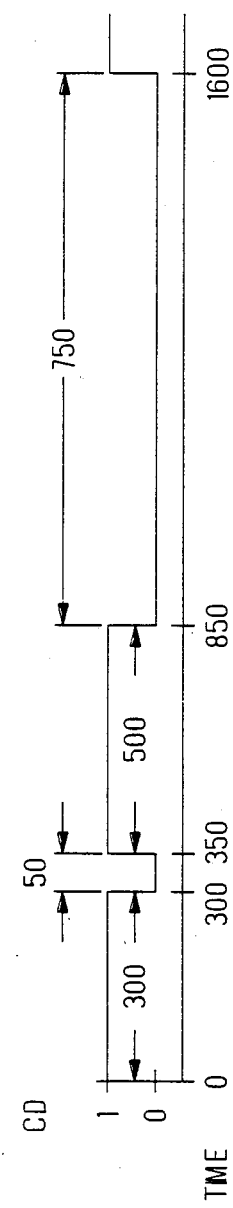

| ANALYSIS SOFTWARE |
|---|
| MENU 0 – PRINT PACKETS STARTING AT M AND ENDING AT N |
| MENU 1 – PRINT GAPS STARTING AT M AND ENDING AT N |
| MENU 2 – COUNT PACKETS STARTING AT M AND ENDING AT N |
| MENU 3 – COUNT GAPS STARTING AT M AND ENDING AT N |
| MENU 4 – COUNT EVENTS M CONSECUTIVE PACKETS/GAPS |
| MENU 5 – SUMMARIZE PERFORMANCE |
| MENU 6 – PRINT THE TIMING ENTRIES |
| MENU 7 – PRINT HISTOGRAM FOR PACKETS |
| MENU 8 – PRINT HISTOGRAM FOR GAPS |
| MENU 9 – COLLECT NEW SAMPLES |
| MENU O – OPEN A FILE FOR OUTPUT |
| MENU C – CLOSE AN OUTPUT FILE |
| MENU Q – QUIT |

FIG.6

PACKET NETWORK TIMING ANALYZER

BACKGROUND OF THE INVENTION

This invention relates to a timing analyzer for a packet network such as a local area network that allows data to be collected automatically regarding the network use patterns.

In a packet network such as a local area network multiple computers exchange messages via a common network medium such as a fiber optic cable. A wide variety of formats and protocols are used to ensure that messages or packets sent by a sending computer are received by the intended receiving computer. Particularly when a large number of computers are coupled to a single network, it ofteen becomes important to understand the use patterns of the network. In particular, if multiple packets are transmitted at simultaneous or near simultaneous times, so called collisions result. An excessive number of collisions can interfere with efficient operation of the network. Furthermore, noise and other unwanted signals can interfere with the intended reception of packets of data. Additionally, other information such as the average size of data packets, the average gap between adjacent packets, and the fraction of time during with packets are being sent are all relevant in analyzing the operation of a network in a given application.

In the past, logic analyzers and oscilloscopes have been used in an attempt to analyze short time periods of operation of a local area network. This approach allows a short segment of a digital signal, such as the carrier detect signal in a local area network, to be graphically displayed. In this approach the logical state of the signal being displayed is often tested on a periodic basis, and the result of each test is stored. The stored data can then be displayed graphically to allow analysis of the time evolution of the signal for a short time period. This approach is limited by the fact that it is not well-suited for long term monitoring. This is because an extremely large storage capacity would be required if the digital signal were tested and stored on a long term basis.

Another approach is used by commercial traffic monitors for local area networks. Such traffic monitors decode packets of data in order to monitor the transmitted data on the network. This approach suffers from several disadvantages. First, since only decoded data is collected, such monitors ignore noise and data in unexpected protocols. Furthermore, the monitor itself must be programmed to respond to the particular data packet protocol used in the local area network being monitored. Since this approach monitors decoded data it is not well-suited to detect short time interval events on the local area network (such as noise) or timing details regarding collisions between data packets.

Thus, both of the prior art approaches discussed above suffer from particular disadvantages, and the need exists for an improved timing monitor which provides high time resolution, yet which is well-suited to monitor activity on a packet network for extended time periods without requiring excessive memory or other storage capacity.

SUMMARY OF THE INVENTION

According to this invention a packet network timing analyzer comprises means, responsive to a signal on a packet network, for generating a carrier detect signal indicative of the presence of signaling activity on the packet network. Means are also provided for storing a plurality of timing entries indicative of the development in time of the carrier detect signal. These timing entries are preferably stored at aperiodic intervals determined by the state of the carrier detect signal itself. Preferably, only one timing entry is stored for each change of state of the carrier detect signal. Preferably, means are provided for sorting the stored timing entries to locate the stored timing entires that meet selected sorting criteria. As pointed out below, these sorting criteria can include criteria such as selecting timing entries indicative of packets shorter than a selected duration or gaps shorter than a selected duration.

The preferred embodiment described below monitors the carrier detect signal rather than the decoded data. For this reason, it is extremely well-suited to monitoring activity on a packet network such as a local area network with high time resolution. Furthermore, since the monitoring does not require that the data be decoded, this approach works regardless of the protocol or format used to structure data packets or to encode data. Furthermore, in the preferred embodiment described below only a single number (the duration of the interval) is stored for each packet and for each gap. This allows long term monitoring at high time resolution with small memory requirements.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of a preferred embodiment of the timing analyzer of this invention coupled to a local area network.

FIG. 2 is a block diagram of the carrier detect circuit of FIG. 1.

FIGS. 3A and 3B are a detailed schematic diagram of the carrier detect circuit of FIG. 2.

FIG. 5 is a waveform of a carrier detect signal that is used to illustrate the operation of the program of FIG. 4.

FIG. 6 is a block diagram of the analysis of FIG. 1.

DETAILED DESCRIPTION OF THE PREFERRED EMBODIMENTS

Figure 4:
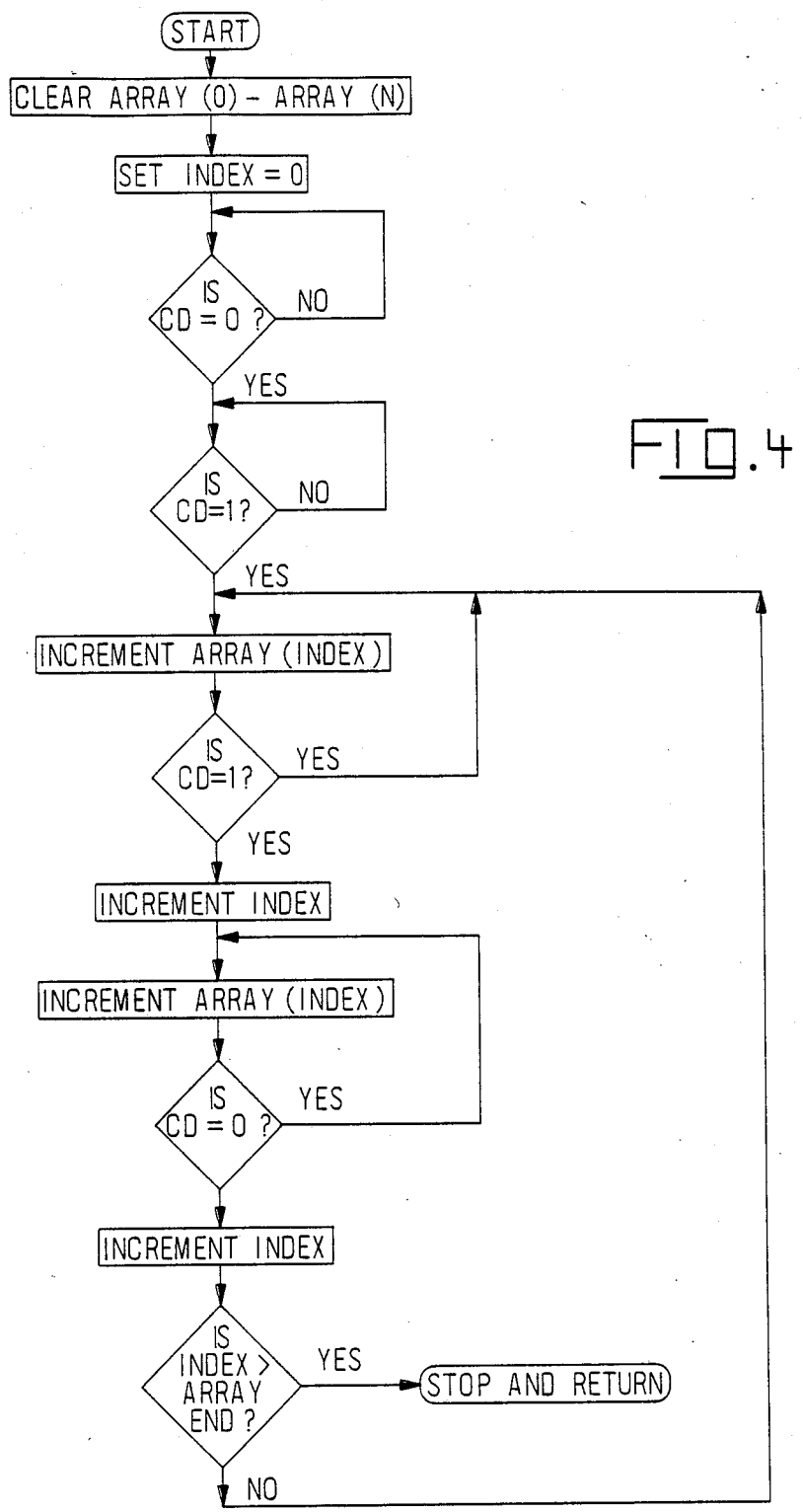
FIG. 4 is a flow chart of the timing entry collection software 26 of FIG. 1.

Turning now to the drawings, FIG. 1 shows a block diagram of a local area network 10 that incorporates a presently preferred embodiment 20 of the timing analyzer of this invention. As shown in FIG. 1 this local area network 10 includes a plurality of computers 12 which are interconnected by a local area network medium 14 such as a fiber optic cable. Each of the computers 12 includes conventional LAN software that allows the computers to communicate with one another via the medium 14.

The timing analyzer 20 includes a carrier detect circuit 22 that is coupled to the medium 14. This carrier detect circuit 22 includes circuitry described below in connection with FIGS. 2 and 3 that detects the presence of a carrier on the medium 14 and generates a two-state logic signal that is applied as an input to a computer 24.

The computer 24 includes collection software 26 and analysis software 28. The collection software 26 times the periods when the carrier detect signal indicates the presence of a carrier as well as the periods when the carrier detect signal indicates the absence of a carrier and stores these numbers as timing entries in an array. The collection software is described in greater detail below in conjunction with FIGS. 4 and 5.

The analysis software 28 sorts, displays and counts the array of timing entries generated by the collection software 26 in various ways and displays the results on display 30. The display 30 can for example by a CRT or a printer. The analysis software 28 is described in greater detail below in connection with FIG. 6.

Turning now to FIGS. 2 and 3, the presently preferred carrier detect circuit 22 is there shown in greater detail. The following discussion will refer only to the block diagram of FIG. 2, but the detailed schematic diagram of FIG. 3 provides full detail for the presently preferred embodiment of the carrier detect circuit 22.

As shown in FIG. 2 the carrier detect circuit 22 includes a detector 32 that is coupled to receive signals from the medium 14. In this embodiment the medium 14 is a fiber optic cable and the detector 32 includes a photodetector which generates electrical signals in response to the optical signals present on the medium 14. The analog electrical signals generated by the detector 32 are digitized by an A to D converter 34 to produce two-state logic signals indicative of the presence or absence of pulses on the medium 14. The output of the A to D converter 34 is supplied to the clear input of a first counter 36. The first counter 36 counts clock signals from a 2 MHz clock 38, and pulses from the A to D converter 34 reset the first counter 36. In this embodiment the first counter is programmed to count to 7 and to clear a second counter 40 every time a count of 7 of the clock pulses is obtained. The counter 40 also counts clock pulses from the clock 38 and the second counter 40 generates on its output a carrier detect signal CD once the second counter 40 counts 15 cycles of the clock signal from clock 38.

The carrier detect signal CD is in the logic 0 state except during time periods when the carrier is detected on the LAN medium 14. Packets of data on the medium 14 are preceded by a preamble of pulses, in this embodiment separated by a period twice that of the clock 38. These pulses are detected by the detector 32 and converted to digital form by the converter 34. They act to clear the first counter 36 repeatedly, thereby preventing the first counter 36 from clearing the second counter 40. This allows the second counter 40 to count to 15 and beyond, thereby placing the carrier detect signal CD in the logic 1 state, indicative of the presence of a packet of data. At the end of the packet of data the detector 32 detects no more pulses, and the counter 36 is not cleared repeatedly. This allows the counter 36 to count to 7, and when it does it clears the counter 40 and resets the carrier detect CD to a logic 0, indicating a gap between packets.

Thus, the computer 24 receives a two-state carrier detect signal CD from the carrier detect circuit 22, and this signal is in the logic 1 state when a carrier is detected on the medium 14, and a logic 0 state during gaps when no carrier is detected. In the following discussion a period when the carrier detect signal CD is in the logic 1 state will be referred to as a packet interval, a period when the carrier detect signal CD is in the logic 0 state will be referred to as a gap.

Conventional LAN interface circuits typically include some type of carrier detect circuit which is used in controlling transmission and reception of data packets to and from the medium. See for example U.S. patent application Ser. No. 06/931,578, filed Nov. 17, 1986, entitled "Optical Interface", which describes in connection with FIG. 4 a carrier detect circuit very similar to that of FIG. 3 of the present specification. These and other prior art carrier detect circuits can readily be adapted for use with the present invention.

As mentioned above, the computer 24 includes both timing entry collection software 26 and analysis software 28. The timing entry collection software 26 is flow charted in FIG. 4. As shown in FIG. 4, this software first clears an array of N timing entries, where N is the total number of timing entries to be collected. The routine then sets INDEX to 0 and waits until the carrier detect signal CD passes through the logic 0 state and the logic 1 state. At this point the routine increments ARRAY(INDEX), checks to determine whether the carrier detect signal CD is still in the logic 1 state in decision block 44, and then returns to increment ARRAY(INDEX) as long as this is the case. This loop continues until the carrier detect signal CD changes to the logic 0 state, in which event control passes from decision block 44 to block 46 where INDEX is incremented. The routine then increments ARRAY(INDEX), checks to determine that the carrier detect signal CD is still in the logic 0 state (indicative of a gap) in decision block 48, and continues to loop as long as the carrier detect signal CD remains in the logic 0 state. When this is no longer the case (because the carrier detect signal CD has transitioned to the logic 1 state) control is transferred from decision block 48 to block 50 where INDEX is again incremented. INDEX is then checked in block 52 to determine whether it is greater than the preset limit. If so, the routine terminates in block 54; otherwise, control is returned to block 42 and the monitoring continues.

The operation of the routine of FIG. 4 can be illustrated with the waveform example of FIG. 5. FIG. 5 shows an exemplary evolution in time of the carrier detect CD, as the carrier detect signal CD changes between the logic 0 state (indicative of a gap) and the logic 1 state (indicative of the presence of the carrier). In FIG. 5 the horizontal axis is the time axis in time units. In this example CD is in the logic 1 state for 300 time units, in the logic 0 state for 50 time units, in the logic 1 state for 500 time units, and then the logic 0 state for 750 time units.

This time pattern of evolution of the carrier detect signal CD would cause the program of FIG. 4 to set ARRAY(0) through ARRAY(3) equal to the numbers 300, 50, 500, 750, respectively. In this way, the complete time history of the CD waveform is stored in a highly compressed form that requires little by way of memory or storage capacity.

If the smallest gap on a LAN is 500 time units in length, the largest may be over 100,000 time units when the network is not busy. Packets may vary in length from 100 times units to 8,000 time units or more. A graphical representation of just a few packets and gaps could be very large in size and take up a large amount of memory or storage space to show the large gaps. For this reason, the embodiment described above provides important advantages over conventional logic analyzers that periodically store the value of a signal at a fixed time interval. Such conventional logic analyzers would require extremely large storage requirements to store typical sequences of packets and gaps that could be represented by the program of FIG. 4 for example as 100, 50, 8,000, 10,000, 100, 50.

The time units that are used in the example of FIG. 5 are related to the time required for one pass through the loop made up of blocks 42, 44 for example. The elapsed time corresponding to one pass through such a loop will of course vary, depending upon the particular implementation. The time units of FIG. 5 can be scaled into seconds by determining the time required for each pass through the loop made up of blocks 42 and 44. This can be done by resetting a real time clock on a computer, starting the clock, and then repeating the steps of blocks 42 and 44 a large number of times, such as 1,000 times for example. Then the clock is read to determine the elapsed time required for 1,000 passes through the loop. This time, which is typically on the order of 4,000 microseconds, can then be used in the main routine for calibration purposes. Of course, it is not necessary to have a loop with 1,000 sets of instructions corresponding to the blocks 42 and 44. This 1,000 pass program can be constructed by iterating a smaller loop that is made up of a smaller number of sets of instructions. In order to minimize timing errors the calibration routine should be carefully controlled to ensure that the time spent in decrementing and testing the count for the loop does not create excessive errors in the calibration.

From this description it should be apparent that the program of FIG. 4 measures and stores a one dimensional array of timing entries as ARRAY(O)-ARRAY(N). These timing entries alternate between timing entires for packets and timing entries for gaps. The timing entries for packets indicate the elapsed time during which the carrier detect signal CD is in the logic 1 state, and the timing entries for gaps indicate the elapsed time during which the carrier detect signal is in the logic 0 state. It should be noted that these timing entries are aperiodically recorded at intervals determined by the changes of state of the carrier detect signal CD, and not at a preset periodic interval. In addition, only one timing entry is stored for each change of state of the carrier detect signal. This results in a high degree of data compression as explained above.

The analysis software 28 of FIG. 6 utilizes the stored timing entries in order to display useful timing information regarding the network 10.

The precise analysis performed by the software 28 can vary widely depending upon the application. However, in this embodiment the analysis software 28 performs a number of functions that are well-suited to aid in diagnosis of timing problems in the network 10. In this embodiment the analysis software 28 performs nine separate types of analyses corresponding to nine menu instructions, Menu 0–Menu 9:

Menu 0—In this mode the software 28 will print timing entries for packets between two packet lengths on a CRT. For example, in this mode the user can ask that all timing entries be printed for packets having a length between 0 and 100. Typically, in any given protocol packets shorter than some predetermined length will be incomplete packets. These packets are an indication of noise, collisions or other problems on the network 10, and a list of the associated timing entries can be very useful in diagnosing timing problems.

Menu 1—In this mode the software 28 prints all timing entries for gaps longer than a first gap length and shorter than a second gap lenth. For example, this mode can be used to print the timing entries for all gaps between the lengths of 0 and 100 time units.

Menu 2—In this mode the analysis software 28 counts the total number of packets between the two stated packet lengths and prints this count on the screen. For example this mode can be used to obtain a count of the total number of packets between the lengths of 0 and 100 time units during the collection period.

Menu 3—In this mode the analysis software 28 counts the total number of gaps between two selected gap lengths and prints this count on the screen. For example, this mode can be used to count the total number of gaps between lengths 0 and 100.

Menu 4—In this mode the analysis software 28 counts the consecutive packets or gaps between two packet/-gap lengths and prints this count on the screen. For example, in this mode the software 28 can be used to count the number of consecutive packets or gaps between the lengths of 0 and 100.

Menu 5—In this mode the analysis software 28 summarizes the performance of the network 10. It prints on the screen the average packets per second, the average bytes per second, the percentage of time the carrier detect signal was detected, the percentage of time the carrier detect signal was not detected, the shortest and longest packets detected, and the shortest and longest gaps detected.

Menu 6—In this mode the analysis software 28 prints the entire array of timing entries, thereby displaying the lengths of consecutive packets and gaps on the screen.

Menu 7—In this mode the analysis software 28 calculates a histogram for packet lengths and prints the histogram on the screen. This program asks the user to supply the starting and end values of the histogram, and allows the user to scale the Y-axis. For example, this mode can be used to print the histogram for packet lengths between 0 and 1,000 up to a maximum count of 50.

Menu 8—In this mode the analysis software 28 calculates a histogram for gap lengths and prints the histogram on the screen. The program asks the user to supply the starting and end values of the histogram, and allows the user to scale the Y-axis. For example, in this mode the software 28 can be used to print the histogram for gap lengths between 0 and 5,000 up to a maximum count of 100.

Menu 9—In this mode the analysis software 28 controls the collection software 26 to collect new timing entries from the network. The user is asked to supply the number of entries to be collected from the network. In this embodiment up to 4096 entries can be collected for analysis.

In addition, the analysis software 28 has three other menu options: Menu O, Menu C and Menu Q. Menu O is used to open a file for output, Menu C closes an output file, and Menu Q allows the user to quit the program.

Appendix 1 is an object codde lisiting of the presently preferred embodiment of the collection software 26 and the analysis software 28. This listing is of an EXE file for IBM DOS, and is suitable for use on an IBM PC computer with 512K memory; it assumes that the carrier detect signal CD is supplied to computer port 369H. Of course, this listing is not intended in any way to be limiting, and is only provided to disclose the best mode presently contemplated by the inventors.

The preferred embodiment described above is adapted for use with one type of a packet network. In this embodiment it is the presence or absence of pulses on the medium 14 that controls generation of the carrier detect signal CD. Of course, other approaches can be used. For example, some networks utilize a DC or RF optical or electrical signal which is present during signaling activity, and the presence or absence for this DC or RF signal can be used as the basis for generating the carrier detect signal in the logic 1 or logic 0 state. In addition, not all embodiments of this invention require each software timers as described above to measure the elapsed time during which the carrier detect signal CD is in selected states. Hardware timing circuits can easily be designed to perform this timing function. Furthermore, it is not essential in all embodiments that the timing entries be indicative of elapsed time. In some embodiments it may be preferable to store clock time in the timing entries. This allows the elapsed time to be determined by subtracting adjacent timing entries from one another.

From the foregoing description it should be apparent that a timing analyzer has been described which operates with extremely high timing resolution because it operates directly on the carrier detect signal. This analyzer is not dependent upon recognizing any particular protocol or format for data, and thus it can be used with a wide variety of local area networks without modification. Furthermore, since the timing analyzer operates at extremely high time resolution, it provides useful information in diagnosing high speed timing errors, collisions and the like. All of this is obtained while minimizing the data storage requirements of the analyzer. This is possible because of the data compression techniques described above, which markedly reduce the total storage requirements of the system.

In view of the many possible modifications and alterations to the preferred embodiments described above, it is intended that the foregoing detailed description be regarded as illustrative rather than limiting, and that it be understood that it is the following claims, including all equivalents, which are intended to define the scope of this invention.

I claim:

1. A packet network timing analyzer comprising:
   means, responsive to a signal on a packet network, for generating a carrier detect signal in a first state during packet intervals characterized by signalling activity on the packet network and in a second state during gaps characterized by an absence of signalling activity on the packet network;
   and means for storing a plurality of timing entries indicative of the development in time of the carrier detect signal, said timing entries stored at periodic intervals determined by changes in state of the carrier detect signal.

2. The invention of claim 1 wherein said storing means stores timing entries both for time periods when the carrier detect signal is in the first state and for time periods when the carrier detect signal is in the second state.

3. The invention of claim 1 wherein alternate ones of the timing entries relate to time periods when the carrier detect signal is in the first state and intervening ones of the timing entries relate to time periods when the carrier detect signal is in the second state.

4. The invention of claim 1 wherein the packet network is a local area network which comprises a fiber optic signal transmission medium, and wherein the local area network carries optical signals on the fiber optic signal transmission medium.

5. A packet network timing analyzer comprising:
   means, responsive to a signal on a packet network, for generating a carrier detect signal in a first state during packet intervals characterized by signalling activity on the packet network and in a second state during gaps characterized by an absence of signalling activity on the packet network; and
   means for timing a plurality of elapsed times, each indicative of a duration of a respective time period when the carrier detect signal is in one of the first and second states, and for generating a plurality of timing entries indicative of said elapsed times; and
   means for storing said timing entries for later analysis.

6. The invention of claim 5 wherein said timing means generates timing entries both for time periods when the carrier detect signal is in the first state and for time periods when the carrier detect signal is in the second state.

7. The invention of claim 5 wherein alternate ones of the timing entries relate to time periods when the carrier detect signal is in the first state and intervening ones of the timing entries relate to time periods when the carrier detect signal is in the second state.

8. The invention of claim 5 wherein the packet network is a local area network which comprises a fiber optic signal transmission medium, and wherein the local area network carries optical signals on the fiber optic signal transmission medium.

9. A packet network timing analyzer comprising:
   means, responsive to a signal on a packet network, for generating a carrier detect signal in a first state during packet intervals characterized by signalling activity on the packet network and in a second state during gaps characterized by an absence of signalling activity on the packet network;
   means for storing a plurality of timing entries indicative of the development in time of the carrier detect signal, said storing means storing only one timing entry for each change of state of the carrier detect signal.

10. The invention of claim 9 wherein said storing means stores timing entries both for time periods when the carrier detect signal is in the first state and for time periods when the carrier detect signal is in the second state.

11. The invention of claim 9 wherein alternate ones of the timing entries relate to time periods when the carrier detect signal is in the first state and intervening ones of the timing entries relate to time periods when the carrier detect signal is in the second state.

12. The invention of claim 9 wherein the packet network is a local area network which comprises a fiber optic signal transmission medium, and wherein the local area network carries optical signals on the fiber optic signal transmission medium.

13. A packet network timing analyzer comprising:
   means, responsive to a signal on a packet network, for generating a carrier detect signal in a first state during packet intervals characterized by signalling activity on the packet network and in a second state during gaps characterized by an absence of signalling activity on the packet network;
   means for storing a plurality of timing entries indicative of the development in time of the carrier detect signal; and
   means for sorting the stored timing entries to locate the stored timing entries that meet selected sorting criteria.

14. The invention of claim 13 wherein the selected sorting criteria comprise the criterion that stored timing entries indicate packet intervals shorter than a selected duration.

15. The invention of claim 14 wherein the selected duration is characeristic of incomplete signal packets on the local area network.

16. The invention of claim 13 wherein the selected sorting criteria comprise the criterion that stored timing entries indicate gaps shorter than a selected duration.

17. The invention of claim 13 wherein said storing means stores timing entries both for time periods when the carrier detect signal is in the first state and for time periods when the carrier detect signal is in the second state.

18. The invention of claim 13 wherein alternate ones of the timing entries relate to time periods when the carrier detect signal is in the first state and intervening ones of the timing entries relate to time periods when the carrier detect signal is in the second state.

19. The invention of claim 13 wherein the packet network is a local area network which comprises a fiber optic signal transmission medium, and wherein the local area network carries optical signals on the fiber optic signal transmission medium.

20. A packet network timing analyzer comprising:
   means, responsive to a signal on a local area network, for generating a carrier detect signal indicative of the presence on signalling activity on the packet network;
   means, responsive to the carrier detect signal, for storing information indicative of a pattern of generation of the carrier detect signal, said information storing means comprising means for storing a sequence of timing entries, a first set of said timing entries each being indicative of a duration of a respective time interval during which the carrier detect signal is generated; and
   means for utilizing the timing entries to display timing information for the packet network.

21. The invention of claim 20 wherein a second set of timing entries is each indicative of a duration of a respective time interval during which the carrier detect signal is not generated.

22. The invention of claim 20 wherein the packet network is a local area network which comprises a fiber optic signal transmission medium, and wherein the local area network carries optical signals on the fiber optic signal transmission medium.

* * * * *